(12) United States Patent
Bland (10) Patent No.: US 11,465,313 B2
(45) Date of Patent: Oct. 11, 2022

(54) KNIFE SET-UP GAUGE FOR CUTTER HEAD OF A WOOD SHAPER

(71) Applicant: WOODMASTER TOOLS, INC., Kansas City, MO (US)

(72) Inventor: Barry G. Bland, Gladstone, MO (US)

(73) Assignee: WOODMASTER TOOLS, INC., Kansas City, MO (US)

(*) Notice: Subject to any disclaimer, the term of this patent is extended or adjusted under 35 U.S.C. 154(b) by 897 days.

(21) Appl. No.: 16/288,553

(22) Filed: Feb. 28, 2019

(65) Prior Publication Data

US 2019/0270218 A1  Sep. 5, 2019

Related U.S. Application Data

(60) Provisional application No. 62/636,915, filed on Mar. 1, 2018.

(51) Int. Cl.
*B27G 23/00* (2006.01)
*B23Q 17/22* (2006.01)
*B27C 1/14* (2006.01)
*B27G 21/00* (2006.01)

(52) U.S. Cl.
CPC ......... *B27G 23/00* (2013.01); *B23Q 17/2225* (2013.01); *B27C 1/14* (2013.01); *B27G 21/00* (2013.01)

(58) Field of Classification Search
CPC .... B27C 1/02; B27C 1/04; B27C 1/08; B27C 1/14; B27G 13/00; B27G 13/04; B27G 23/00; B23Q 1/0054; B23Q 3/186; B23Q 17/22; B23Q 17/2208; B23Q 17/2216; B23Q 17/2291; B23Q 16/004; B23Q 16/005; B23Q 2716/00
See application file for complete search history.

(56) References Cited

U.S. PATENT DOCUMENTS

| 4,977,937 | A | * | 12/1990 | Hessenthaler | ........ | B27L 11/005 |
| | | | | | | 144/241 |
| 5,675,903 | A | * | 10/1997 | Cole | .................. | B23Q 17/2233 |
| | | | | | | 33/635 |
| 7,428,784 | B1 | * | 9/2008 | Antonello | .......... | B23Q 17/2225 |
| | | | | | | 33/633 |

OTHER PUBLICATIONS

Infinity cutting Tools, Infinity Cutting Tools—Planer & Jointer Knife Setting Jigs, Jul. 8, 2014, https://www.youtube.com/watch?v=Kk-5J6DkIHY(Year: 2014).*
Infinity cutting Tools, Planer Knife Setting Jig—For Full Size Planers; Pair, https://www.infinitytools.com/planer-knife-setting-jig-for-full-size-planers-pair (Year: 2022).*

\* cited by examiner

*Primary Examiner* — Matthew Katcoff
(74) *Attorney, Agent, or Firm* — Lathrop GPM, LLP (57) ABSTRACT

A set-up gauge for precision alignment of the cutting knives in a cutter head. The set-up gauge utilizes a support bar extending laterally across the wood shaper. Also included is a bracket slidably secured to the support bar and a rod extending outwardly from the bracket, the rod further comprising first end and second ends. Further included is a magnetic disc secured to the second end of the rod, the magnetic disc for contact with a surface of the cutting knives to identify a common inset distance for each of the cutting knives relative to the guide fence.

10 Claims, 6 Drawing Sheets

KNIFE SET-UP GAUGE FOR CUTTER HEAD OF A WOOD SHAPER

RELATED APPLICATION

This application claims the benefit of priority of U.S. Application No. 62/636,915 filed on Mar. 1, 2018.

TECHNICAL FIELD

The present disclosure relates to a set-up gauge for increasing the accuracy of locating multiple cutting knives within a cutter head of a wood shaper.

BACKGROUND

A thickness planer is a woodworking machine to trim boards, also known as stock or blanks, to a consistent thickness along the entire board length and flat on both surfaces. A molder is used to shape wood with profiled cutters, also known as knives. Molders typically require the profiled cutters to be secured into a cutter head that mounts on a shaft of the molder machine.

A planer-molder, also commonly referred to as a shaper, is a wood-working machine that combines the capabilities of the previously described planer and molder. To obtain a smooth finish on the workpiece, a knife is secured to a cutter head that is configured to rotate at high speeds. As the cutter head rotates and the stock passes beneath the cutter head, the knife molds the upper surface of the stock to the desired profile.

To improve the surface quality of the finished workpiece additional knives are added to the cutter head. Cutter heads are each specially configured to contain one or more knives and the knives must be mounted to maintain a balanced cutter head during high speed rotation. Specifically, this means that two knives must be mounted precisely 180 degrees apart or three knives must be mounted at precisely 120 degrees apart in what are referred to as cutter head pockets. The installed knives must all be separated by an equal number of degrees to maintain the balance of the cutter head.

Importantly, the finish quality of the workpiece is highly dependent upon the alignment of the knives with one another. A slight lateral deviation in the alignment between any of the separately mounted knives will result in degraded surface quality of the workpiece. Some planar-molders utilize indentations or striations on the surface of the cutter head to assist the user in determining the desired location of an edge or surface of the cutting knife; however, such indentations are difficult to read and maintaining the position of the knife while tightening the set screw can be challenging and often does not provide the desired result because of movement of the knife when tightening the knife in positioning.

SUMMARY

A molder is a shaper used to shape wood with profiled cutters, also known as knives. A planer is a tool, in this context a motorized tool, used to produce flat surfaces by shaving the surface of the wood. Most molders require the cutters to be secured into a cutter head that mounts on the shaft of the machine; some cutters bolt directly onto the shaft of the machine. The wood being fed into a molder is commonly referred to as either "stock" or "blanks." Some wood molders have multiple heads in both vertical and horizontal orientations. The term "tooling" refers to knives, and cutter heads. Standing from in front of the infeed side of the machine where the stock is fed into the machine a common cutter head configuration is as follows—bottom horizontal head, a right hand vertical side head, a left hand vertical side head, and a top horizontal head.

The disclosed set-up gauge addresses the need to easily avoid positional disparities among the knives within the pockets of the cutter head so that all knives are precisely aligned with one another and thereby improve the quality of the surface finish of the workpiece. Even slight disparities in the alignment of the knives relative to one another will lead to diminished surface finish of the profiled product.

The set-up gauge disclosed herein provides that ability to establish a precise and consistent offset distance from, for example, a reference feature, such as the guide fence of the shaper. Being able to quickly and precisely position the cutting knives within the pocket of the cutter head makes for easy set-up of the shaper for production. In addition, as the cutting knives dull from use the process of replacing them has been made considerably easier with the use of the apparatus and system disclosed herein.

To improve the precision as well as the speed of installation of multiple knives in the cutter head, the disclosed set-up gauge is employed. Specifically, the disclosed knife set-up gauge aligns, relative to a guide fence, at least two cutting knives in separate pockets of a cutter head of a wood shaper. The set-up gauge includes a support bar extending laterally across the wood shaper as well as a bracket slidably secured to the support bar. The set-up gauge includes a rod extending outwardly from the bracket, the rod further comprising a first end and a second end as well as a magnetic disc secured to the second end of the rod, the magnetic disc used for contact with a surface of the cutting knives to identify a common inset distance for each of the cutting knives relative to the guide fence.

Various objects, features, aspects and advantages of the inventive subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims. The contents of this summary section are provided only as a simplified introduction to the disclosure, and are not intended to be used to limit the scope of the appended claims.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
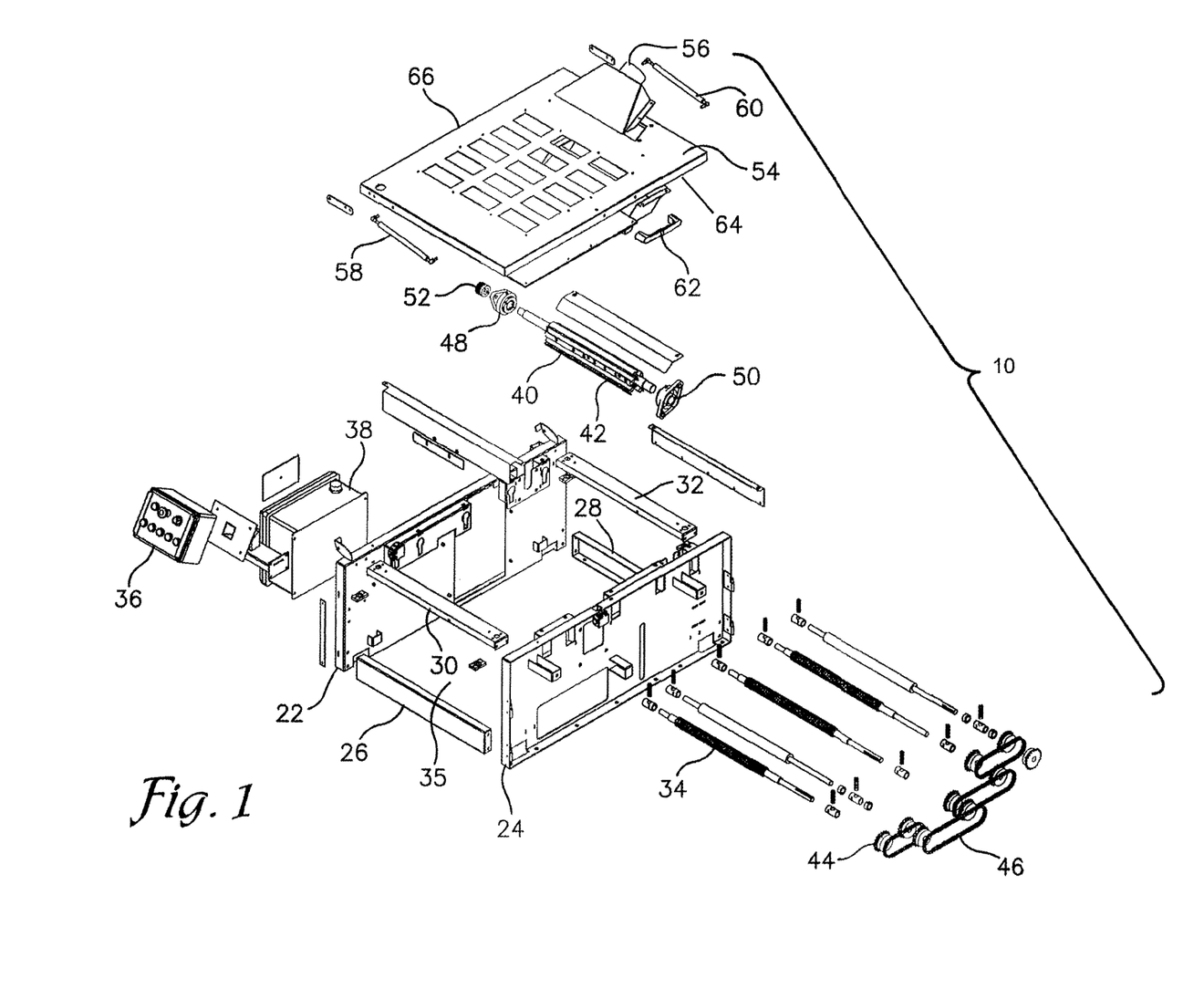
FIG. 1 is an exploded assembly view of an embodiment of a shaper upon which the disclosed set-up gage is employed.

Disclosed herein, and shown in FIG. 1 is an exploded view of a typical shaper to which an embodiment of the disclosed set-up gage is mounted. The displayed embodiment of the shaper 20 utilizes many standard features of shapers to include left and right-hand frame weldments 22, 24 a pair of bottom support bars 26, 28 a pair of frame top cross bars 30, 32 and a plurality of feed rollers 34 for propelling the wood workpiece (not shown) across the bed 35 of the shaper 20. This embodiment also includes a push button enclosure 36 for controlling operation of the shaper 20 as well as an electrical enclosure 38. The workhorse of the shaper 20 is the cutting head 40 which retains the blades, or cutting knives 42, for cutting and shaping of the workpiece as it is passed through the shaper 20. The feed rollers 34 are powered by feed rollers 44 that are driven by roller chains 46 that in turn are powered by an electric drive motor (not shown). The cutting head 40 is held in position by a pair of head bearings 48, 50 and is driven by a spindle pulley 52 located at one end of the cutting head 40. The spindle pulley 52 is driven by a chain or belt drive (not shown) that is in turn driven by an electric motor (not shown).

In operation, a top cover 54 is in position over the workpiece and sawdust from the cutting operation is expelled through a dust chute 56 to either a bag filter (not shown) or vented externally to the ambient atmosphere. When in set-up mode the top cover 54 is preferably in an elevated position, to allow installation and alignment of the tooling and the cover 54 is held in position by a pair of hood lift supports 58, 60. A top cover handle 62 is positioned at the far edge 64, opposite the hinged side 66 of the top cover 54 to facilitate manual lifting of the top cover 54.

Figure 2:
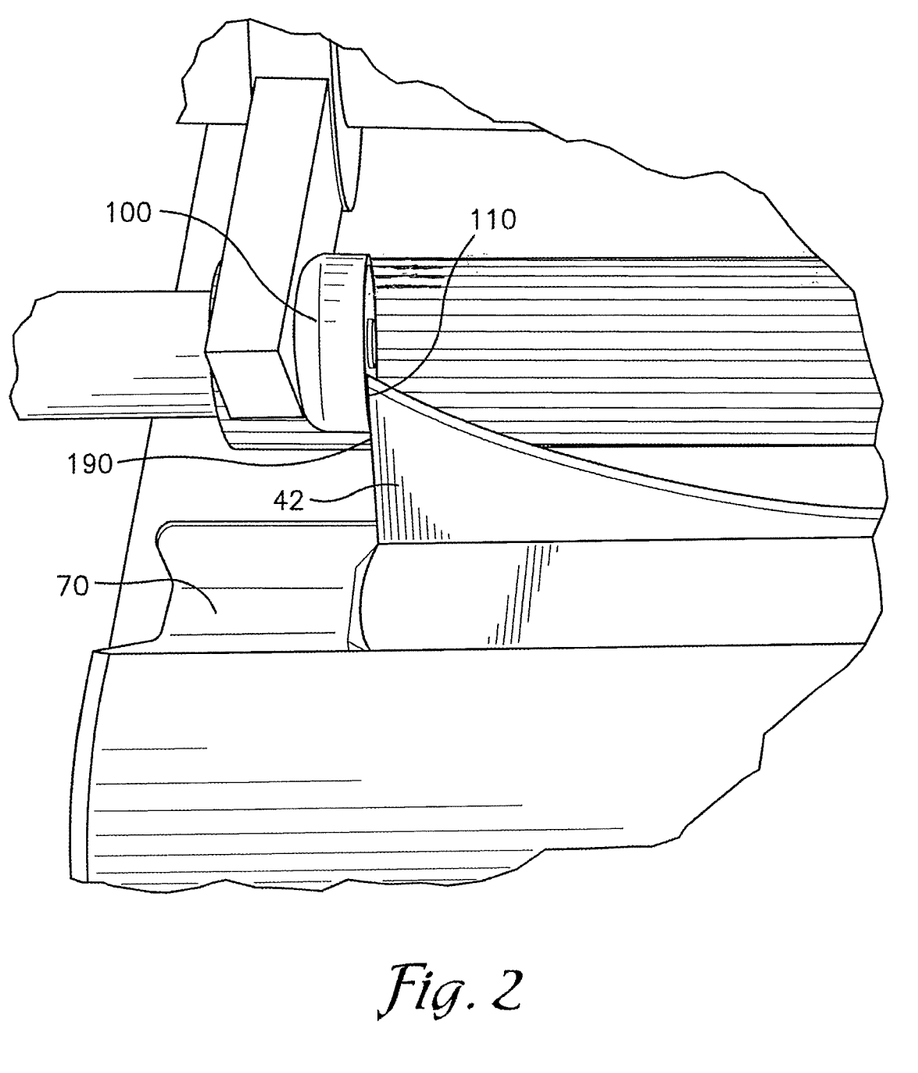
FIG. 2 is a perspective view of an embodiment of the set-up gage in contact with an edge of a cutting knife.
Figure 3:
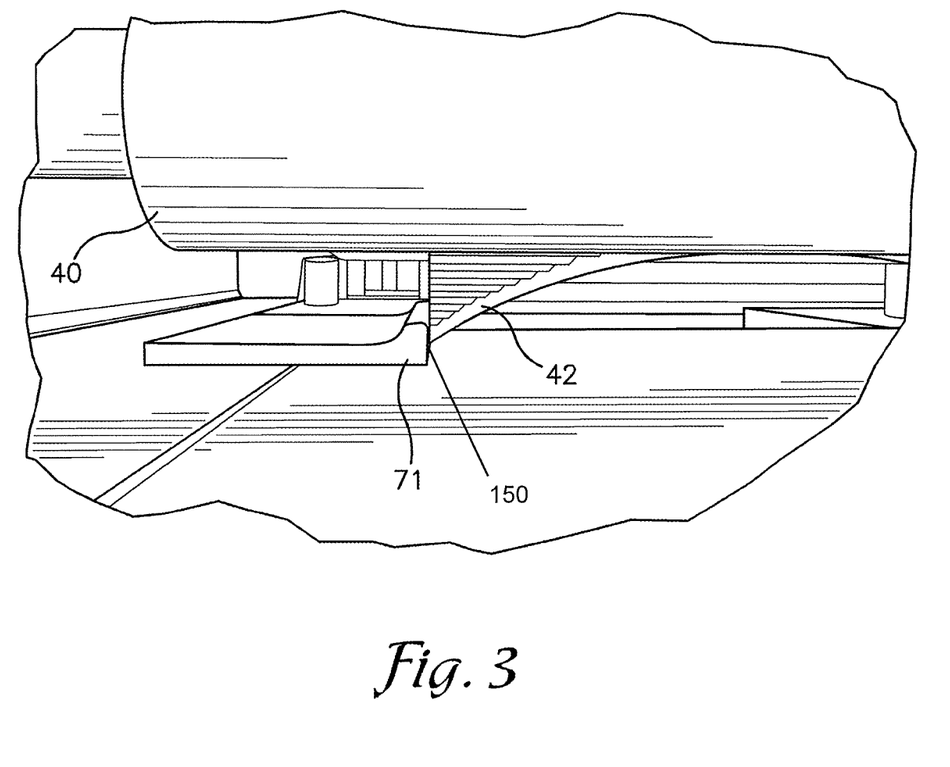
FIG. 3 is a perspective view of a cutting knife aligned by the embodiment of the set-up gage of FIG. 2 clearing the guide fence in the bed of the shaper.

Disclosed herein and as best seen in FIG. 2 is an apparatus and system 10 for consistently positioning the cutting knives 42 within the plurality of pockets 70 of the cutting head 40 of a shaper 20 to improve the surface finish of a wooden workpiece and to prevent interference of the cutting knives 42 with the guide fence 71 as the cutting blades 72 rotate downward toward the bed 35 of the shaper as best seen in FIG. 3. The disclosed system includes a wood shaper 20 with a guide fence 71 and a frame 72, first and second laterally opposed frame weldments 74, 76 in combination with the set of frame top cross bars 30, 32 and the set of frame bottom support bars 26, 28 form the structural foundation of the shaper 20.

The rotating cutting head 40 includes at least two pockets 70 for placement of the cutting knives 42. Generally, two or more cutting knives 42 are included in the cutting head 40 to balance the cutting head during high speed rotation and contact with the workpiece. If two knives are employed then the knives must be separated from one another in pockets 70 that are precisely 180 degrees apart. If three cutting knives are to be utilized then the cutting head must have three pockets that are 120 degrees apart. If four cutting knives, then separation of 90 degrees must exist between each knife, and so on to maintain balance and avoid vibration of the cutting head. The alignment of these spaced apart cutting knives is critical to the surface finish of the workpiece. Even slight misalignment of the cutting knives 42 relative to one another will adversely impact the surface finish of the workpiece. Consequently, it is critical to have the cutting knives aligned with one another and the apparatus and the system disclosed herein addresses that need.

Figure 4:
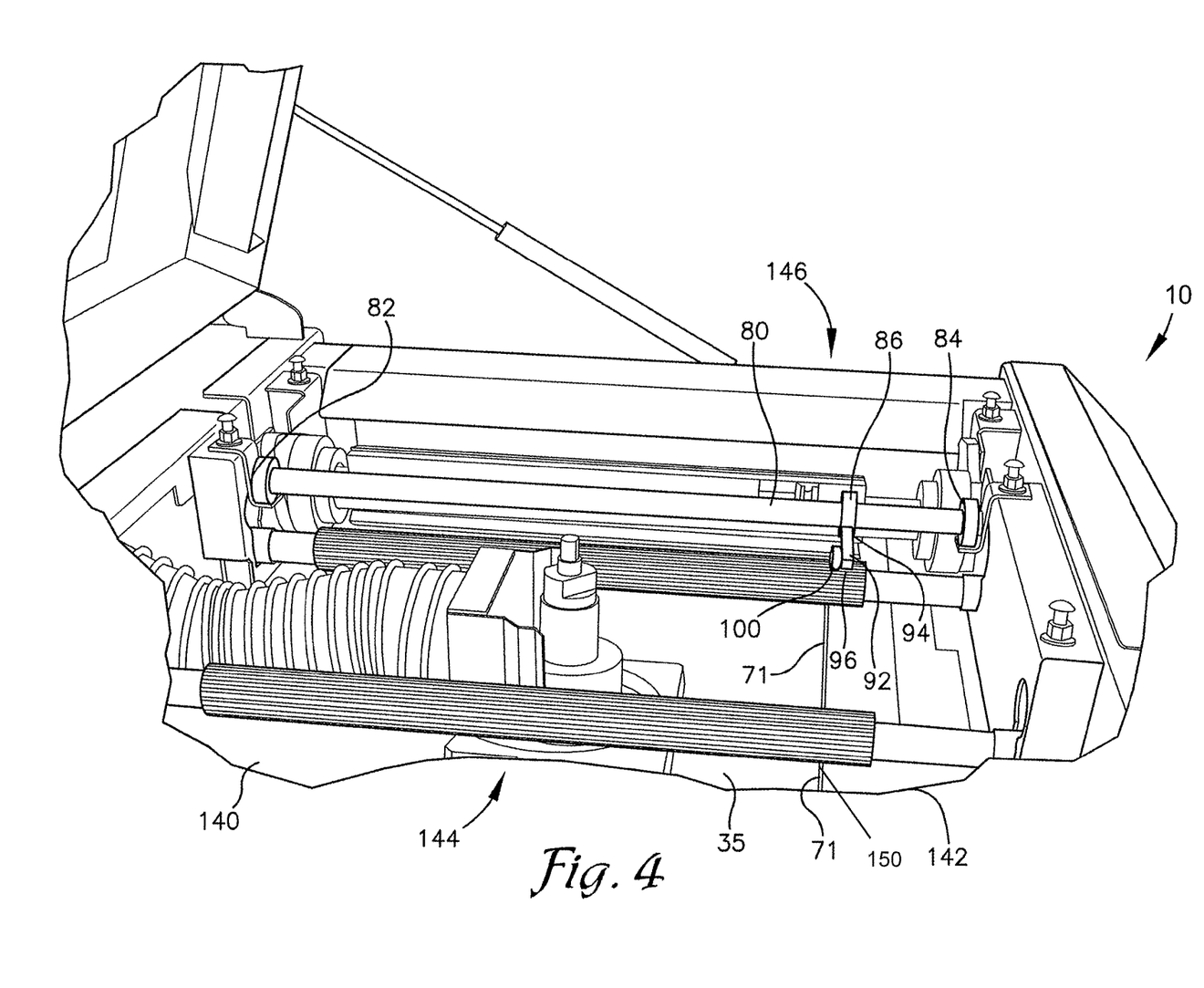
FIG. 4 is a perspective view of a shaper with an embodiment of the set-up gage mounted to the support bar of the shaper.
Figure 5:
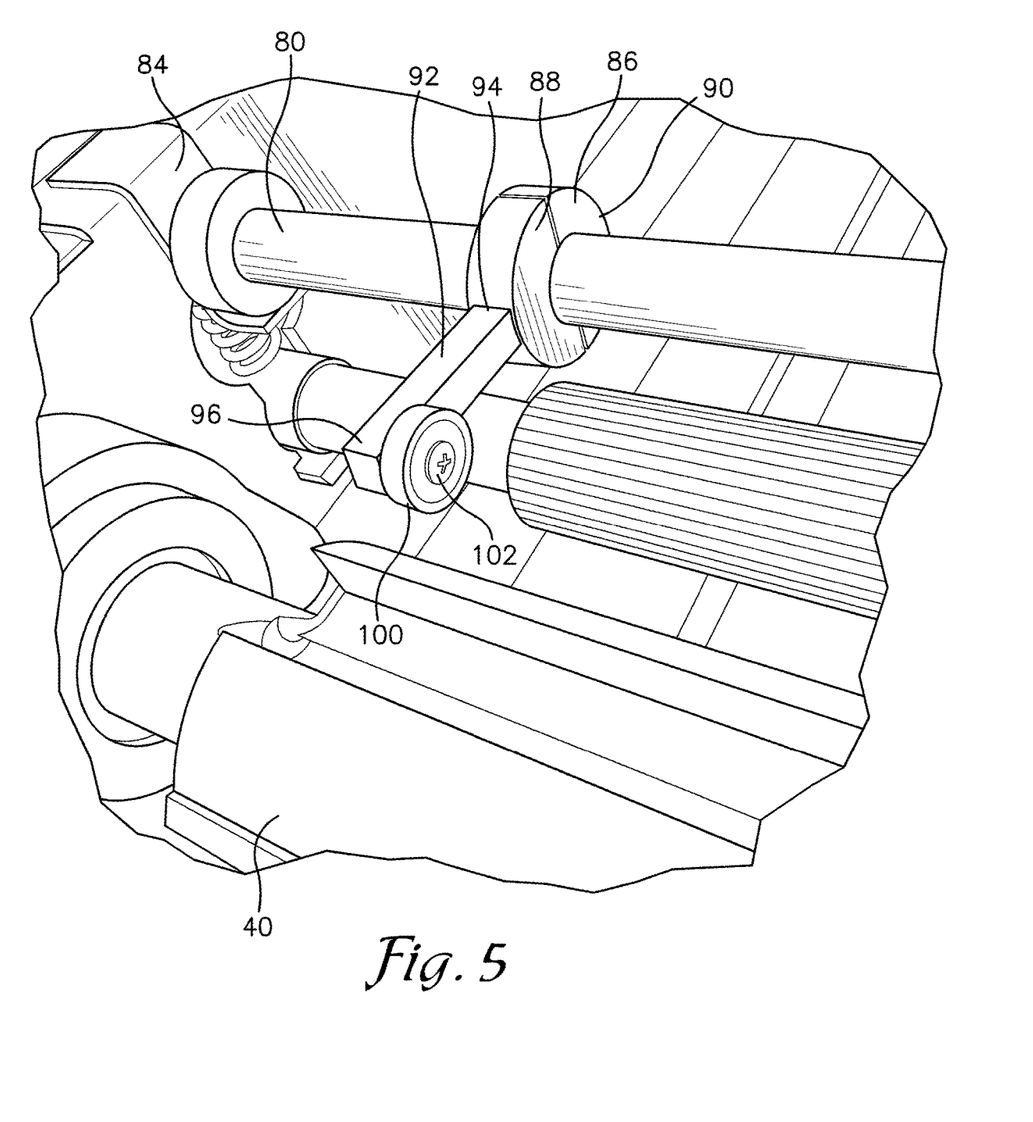
FIG. 5 is a perspective view of an embodiment of the set-up gage disclosed herein.
Figure 6:
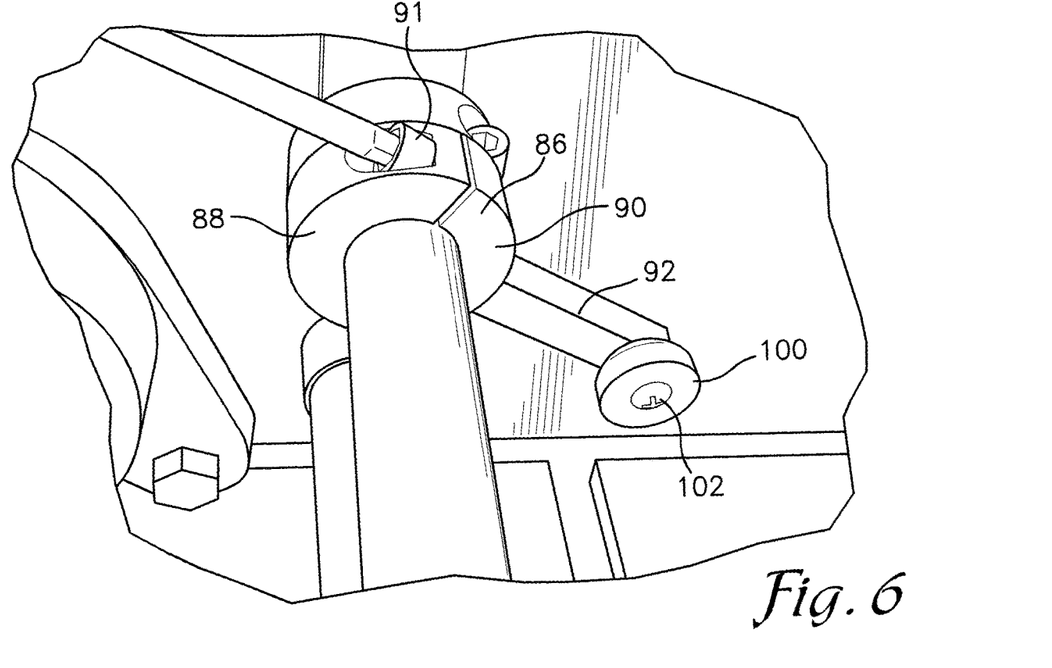
FIG. 6 is a perspective view of an embodiment of the set-up gage disclosed herein mounted to the support bar.

As seen in FIG. 4, the apparatus and system 20 disclosed herein includes a support bar 80 with a first 82 and second end 84. The support bar 80 extends across the bed 35 of the shaper between the first and second laterally opposed frame weldments 74, 76 and are supported in position proximate the first and second ends 82, 84 of the support bar 80. As seen in FIGS. 5 and 6, a bracket 86 preferably comprised of two semi-circular bracket halves 88, 90 are secured together with a removable fastener 91. The bracket 86 is secured to the support bar 80 proximate the second end 84 of the support bar 80. A rod 92 with a first end 94 and a second end 96 is mounted to the bracket at the first end 94. The rod 92 is preferably fabricated from metal; however, any rigid material may be utilized.

As seen in FIGS. 5-6, a magnetic disc 100 is secured to the second end 96 of the rod 92. The magnetic disc is preferable about 0.75 inches in diameter but may be of a wide range of sizes to accomplish the desired functionality. The magnetic disc 100 is preferably secured to the second end 96 of the rod 92 with a fastener 102, such as a metal screw. The desired location of the magnetic disc 100 has the disc preferably aligned with and disposed over the guide fence 71 as best seen in FIG. 4. The objective of locating the disc 100 in this position proximate to and over the guide fence 71 is to allow the disc 100 to magnetically maintain edge contact 110 with and restrain the cutting knife at a specific location within a first pocket 70 of the cutting head 40. The magnetic disc 100 effectively maintains edge contact 110, as seen in FIG. 2, and limits the movement of the cutting knife 42 while the knife is secured in the pocket 70 of the cutting head 40 with fastening means, such as threaded fasteners.

Manual rotation of the cutting head 40 reveals a second pocket for placement of a second cutting knife and the prepositioned magnetic disc 100 is utilized to precisely position and restrain the second cutting knife in the same position in the second pocket as the first cutting knife 42 in the first pocket 70. As with restraint of the first cutting knife 40 the magnetic disc 100 maintains preferably an edge contact 110 with the second cutting knife while fastening means are used to secure the second cutting knife in position. This process is repeated for each cutting knife 42 that is to be utilized in the cutter head 40 and the set-up gage that collectively includes the bracket 86 secured together with a removable fastener 91 the rod 92 and the magnetic disc 100 remain in the same position over the guide fence 71 without any repositioning in order to precisely locate each cutting knife 42 so that each cutting knife 42 is aligned with all of the other cutting knives in the cutting head 40.

As previously discussed, and as seen in FIG. 4, the frame of the wood shaper 20 further comprises a bed 35 over which the workpiece traverses during shaping, the bed further comprises first and second opposing sides 140, 142 and an entry area and an exit area 144, 146. The guide fence 71 is disposed along the second opposing side 142, spans between the entry area and the exit area 144, 146 and extends upwardly from the bed creating a surface 150 against which the workpiece can slide as the workpiece moves from the entry area to the exit area as the cutting knives remove material from the workpiece. The height of the guide fence 71 relative to the bed 35 of the shaper 20 is in preferably consistent across the entire bed and a typical fence height ranges from 0.25 to 1.25 inches. The workpiece is driven across the bed 35 by the powered rollers 34 and the workpiece is preferably guided by hand into the bed to maintain pressure on the workpiece and against the guide fence 71.

Figure 7:
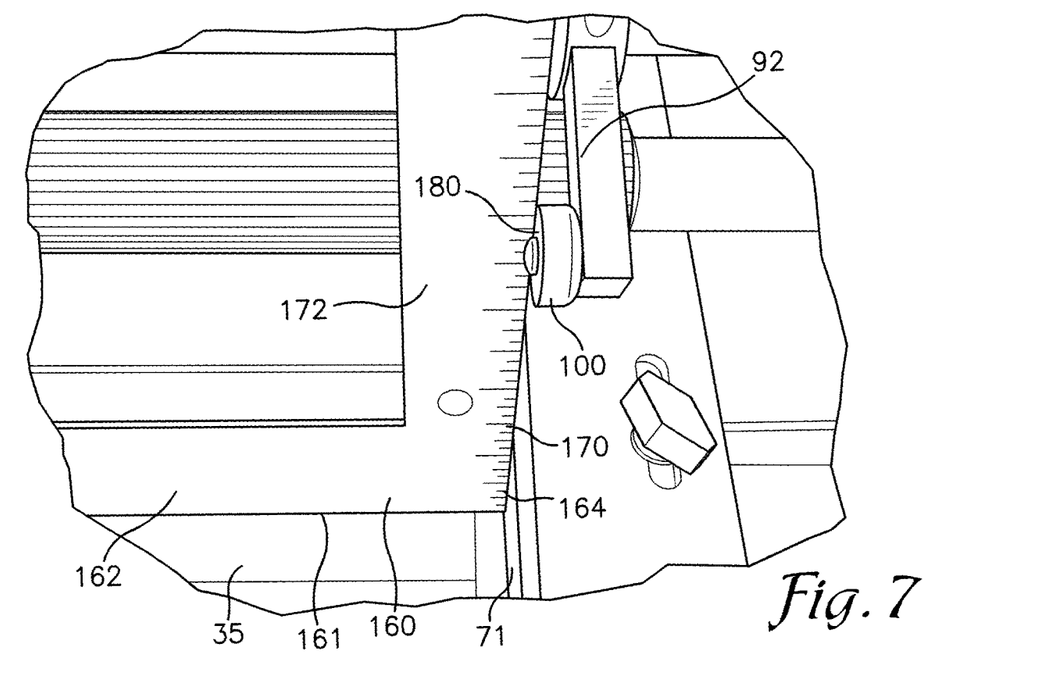
FIG. 7 is a perspective view of an alignment member establishing the offset distance of an embodiment of the set-up gage from the guide fence.

The disclosed system further relies upon the alignment of the magnetic disc 100 over the guide fence 71 by using an alignment member 160. The alignment member 160 is preferably a steel L square ruler as seen in FIG. 7; however, other alignment apparatus may also function equally as well. The bottom edge 161 of the horizontal base 162 of the alignment member 160 is positioned atop the bed 35 of the shaper 20 and the side 164 is positioned against the guide fence 71. FIG. 7 further reveals that the outer edge 170 of the vertical portion 172 of the alignment member 160 is positioned against the distal surface 180 of the magnetic disc 100. Once the distal surface 180 of the magnetic disc is positioned as previously detailed, the set-up gage is now properly in position.

The set-up of the cutting knives 42 can now be expeditiously and safely accomplished now that the set-up gage has been properly positioned. The first cutting knife 42 is positioned in the first pocket 70 and as seen in FIG. 2 the distal end 190 of the cutting knife 42 contacts the magnetic disc 100 along an edge contact 110. Positioning the cutting knife 42 at this location, after alignment with the alignment member 160 ensures that the cutting knife, and specifically the distal end 190 of the cutting knife 42, does not impact the guide fence 71. FIG. 3 reveals how the cutting knife 42 sweeps past the guide fence 71 without interference. This process of aligning subsequent cutting knives 42 in their respective pockets 70 with the magnetic disc is repeated. Once each cutting knife 42 in each respective pocket has been aligned using the magnetic disc of the set-up gage, nearly all variability in position of the cutting knives has been eliminated. Once eliminated, the collection of cutting tools will produce a quality surface finish as the workpiece passes through the shaper 20.

Having shown and described various embodiments of the present invention, further adaptations of the apparatus described herein may be accomplished by appropriate modifications by one of ordinary skill in the art without departing from the scope of the present invention. Potential modifications will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

I claim:

1. A system for consistently positioning cutting knives within a cutting head to improve the surface finish of a wooden workpiece, the system comprising:
   a wood shaper with a guide fence and a frame, the frame further comprising first and second laterally opposed sides;
   at least two pockets formed within the cutting head, the pockets for placement of the cutting knives;
   a support bar with a first and second end, the support bar extending across the frame between the first and second laterally opposed sides;
   a bracket secured to the support bar proximate the second end of the support bar;
   a rod with a first end and a second end, the rod mounted to the bracket at the first end;
   a magnetic disc secured to the second end of the rod, wherein the magnetic disc is aligned with and disposed over the guide fence and the disc magnetically maintains contact with and restrains the cutting knife at a specific location within a first pocket of the cutting head while a threaded fastener secures the cutting knife in position; wherein
   manual rotation of the cutting head reveals a second pocket for placement of a second cutting knife and the prepositioned magnetic disc is utilized to precisely position and restrain the second cutting knife in the same position in the second pocket as the first knife in the first pocket and a threaded fastener secures the second cutting knife in position, wherein the cutting head is again rotated to reveal the existence of additional pockets, if any, within the cutting head, so that additional cutting knives may be precisely located against the magnetic disc and secured in position within the pocket with a threaded fastener.

2. The system of claim 1, wherein the frame of the wood shaper further comprises a bed over which the workpiece traverses during shaping, the bed further comprising first and second opposing sides and an entry area and an exit area.

3. The system of claim 2, wherein the guide fence is disposed along the second opposing side, spans between the entry area and the exit area, and extends upwardly from the bed creating a surface against which the workpiece can slide as the workpiece moves from the entry area to the exit area as the cutting knives remove material from the workpiece.

4. The system of claim 3, wherein the height of the guide fence, relative to the bed of the shaper is in the range of from 0.25 to 1.25 inches.

5. The system of claim 1, wherein a plurality of powered rollers propels the workpiece across the bed of the shaper.

6. The system of claim 1, wherein the location of the magnetic disc is aligned with and disposed over the guide fence.

7. The system of claim 6, wherein the alignment member is a steel L square ruler.

8. A system for consistently locating at least two cutting knives within a cutting head to improve the surface finish of a wooden workpiece, the system comprising:
   a wood shaper with a guide fence and a frame, the frame further comprising first and second laterally opposed sides;
   a support bar with a first and second end, the support bar extending across the frame between the first and second laterally opposed sides;
   a bracket secured to the support bar proximate the second end of the support bar;
   a rod with a first end and a second end, the rod mounted to the bracket at the first end;
   a magnetic disc mounted to the second end of the rod, wherein the location of the magnetic disc is aligned with and elevated over the guide fence and the disc maintains magnetic contact with and restrains the cutting knife while fastening means secure the cutting knife in position; wherein
   manual rotation of the cutting head reveals at least a second pocket for placement of a second cutting knife and the prepositioned magnetic disc is utilized to precisely and expeditiously position and restrain the second cutting knife in the same position as the initially secured cutting knife while fastening means secure the second cutting knife in position, wherein the cutting head is again rotated to reveal the existence of, if any, additional pockets within the cutting head, so that additional cutting knives may be precisely located against the magnetic disc and secured in position with fastening means.

9. The system of claim 8, wherein a steel L square ruler laterally offsets the magnetic disc the thickness of the steel L square ruler from the fence guide to avoid interference between the rotating cutting knives and the guide fence.

10. The system of claim 9, wherein the cutting knives are laterally offset from the guide fence toward the first side of the bed of the shaper.

\* \* \* \* \*